United States Patent [19]

Stevenson

[11] Patent Number: 5,827,144

[45] Date of Patent: Oct. 27, 1998

[54] POWER TRANSMISSION WITH FLEXIBLE DRIVE MEMBER

[75] Inventor: Paul Dwight Stevenson, Ann Arbor, Mich.

[73] Assignee: General Motors Corporation, Detroit, Mich.

[21] Appl. No.: 801,428

[22] Filed: Feb. 18, 1997

[51] Int. Cl.[6] .................................................... F16G 5/00
[52] U.S. Cl. ........................................... 474/201; 474/248
[58] Field of Search .................................... 474/201, 237, 474/244–248, 265

[56] References Cited

U.S. PATENT DOCUMENTS

| | | | |
|---|---|---|---|
| 4,718,881 | 1/1988 | Sugimoto et al | 474/242 |
| 4,767,388 | 8/1988 | Tatara et al. | 474/201 X |
| 4,943,266 | 7/1990 | Mott | 474/201 |
| 5,242,332 | 9/1993 | Douhairet et al. | 474/201 X |

*Primary Examiner*—Thomas R. Hannon
*Attorney, Agent, or Firm*—Donald F. Scherer

[57] ABSTRACT

A drive belt is disposed to transmit power between a pair of sheaves. The sheaves each have an axially adjustable member to vary the transmission ratio between the sheaves. The drive belt has a plurality of block members retained in endless fashion by a pivotal link chain mechanism. The blocks are loaded in compression during a portion of the travel between the sheaves and the chain is loaded in tension during another portion of the travel between the sheaves. The blocks transmit power when loaded in compression and the chain transmits power when loaded in tension. The drive belt therefore transmits power during both portions of travel between the sheaves. A lubrication and cooling liquid is supplied to one sheave at a location near the contact point of the drive belt.

3 Claims, 3 Drawing Sheets

POWER TRANSMISSION WITH FLEXIBLE DRIVE MEMBER

TECHNICAL FIELD

This invention relates to power transmissions, and more particularly, to power transmissions having a liquid lubricated and cooled flexible drive member.

BACKGROUND OF THE INVENTION

Flexible drive mechanisms of the steel belt and block type transmit power on the compression side of the flexible drive mechanism between the sheaves. The flexible inner bands slide on the outer blocks during the belt travel. The steel belts are lubricated and cooled by a liquid, generally transmission oil, introduced at the belt/sheave interface at either or both sheaves.

In order to utilize some of the power available on the tension side of the flexible member, it has been proposed to place the multiple steel bands with a V-shaped rubber or synthetic endless band element. However, these devices will not operate in a liquid lubricated and cooled environment, and therefore, the overall or maximum power transmission is significantly limited.

To overcome the power limitations, it has been proposed to use a relative drive mechanism between an inner surface of the flexible chain and the blocks supported thereon. These mechanisms have been proposed in the form of a toothed chain which engages selected blocks having an inner structure distinct from adjacent blocks. This increases the complexity of the belt assembly, and therefore the cost of the construction and operation.

SUMMARY OF THE INVENTION

It is an object of the present invention to provide an improved flexible drive member for a liquid cooled power transmission.

In one aspect of the invention, a drive belt is comprised of a plurality of metal block members disposed on an endless chain member. The drive belt is operatively connected between a pair of sheaves, wherein the block members have tapered outer surfaces which frictionally engage the sheave surfaces and the chain member has tapered outer surfaces which frictionally engage inner surfaces on the blocks. The blocks transfer power between the sheaves through compression loading on the nontension side of the belt drive, and the chain transfers power between the sheaves on the tension side of the belt drive. A lubrication and cooling liquid is applied to the belt sheave surfaces during power transfer preferably at the belt sheave interface. The chain is formed of a plurality of pivotally interconnected links which are individually wider in the circumferential direction than the block members mounted thereon, such that two or more blocks will be disposed on one link.

Since the belt transfers power on both the tension and the nontension side, the overall capacity of the transmission is increased when compared to similar belt drives wherein the power is transferred through compression only. The flexible drive mechanisms of the present invention will operate in a liquid lubricated and cooled atmosphere and will therefore be capable of transmitting more power in a noncooled and lubricated system.

DESCRIPTION OF THE PREFERRED EMBODIMENT

Figure 1:
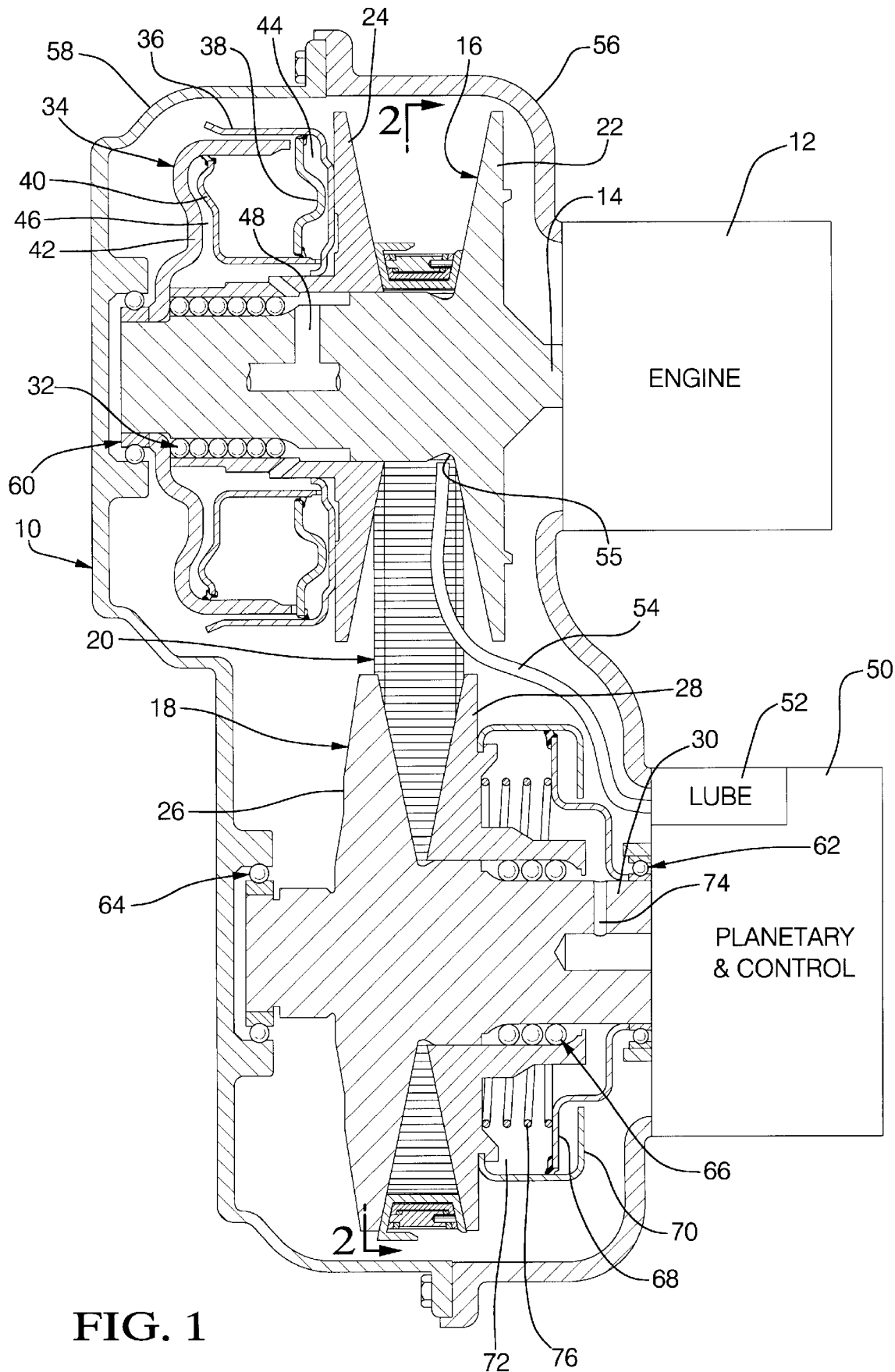
FIG. 1 is a cross-sectional side elevation view of a portion of a transmission incorporating the present invention.

Referring to the drawings, wherein like characters represent the same or corresponding parts throughout the several views, there is seen in FIG. 1 a continuous variable power transmission 10, which is driven by a conventional internal combustion engine 12. The engine 12 drives an input shaft 14 of the transmission 10 through a conventional torque converter or clutch, not shown.

The transmission 10 incorporates an input pulley 16, an output pulley 18 and an endless belt 20 trained between the pulleys 16 and 18. The input pulley 16 has a fixed sheave 22 and a movable sheave 24 which is slidably disposed on the input shaft 14. The fixed sheave 22 is formed integrally with or otherwise secured with the input shaft 14. The output pulley 18 includes a fixed sheave 26 and a movable sheave 28 which is slidably disposed on a transmission output shaft 30. The fixed sheave 26 is integral with or otherwise secured to the output shaft 30.

The movable sheave 24 is supported on the input shaft 14 by a conventional ball spline 32 and controlled in movement thereon by a compound piston arrangement 34. The piston arrangement 34 includes a shroud 36 secured to the sheave 24, a first piston 38 slidably disposed in the shroud 36, a second piston 40 slidably disposed on a hub 42 which is secured to the input shaft 14. The piston 38 cooperates with the shroud 36 to form a hydraulic chamber 44 and the piston 40 cooperates with the hub 42 to form a hydraulic chamber 46.

Fluid pressure is admitted to the chambers 44 and 46 through a passage 48 formed in the input shaft 14. Fluid pressure is supplied to the input shaft from a conventional planetary and hydraulic control system 50. The planetary and hydraulic control system also incorporates a lube system 52 which supplies lubricating and cooling fluid through a conduit 54 which directs fluid from the control 50 to an inner surface 55 of the fixed sheave 22. The routing of fluid from the hydraulic control system 50 to the input shaft 14 is in a conventional manner and is generally conducted through a main housing 56 or a the main housing 56 and an end cap 58.

The input shaft 14 is rotatably supported in the main housing 56 in a conventional manner and is supported in the end cap 58 with a conventional bearing 60. The main housing 56 also supports the output shaft 30 on a conventional bearing 62 while the end cap 58 supports the output shaft 30 in a conventional bearing 64.

The movable sheave 28 of the output pulley 18 is supported for movement axially on the output shaft 30 by a conventional ball spline 66 and is controlled in movement along the shaft by a hydraulic piston 68 which cooperates with a shroud 70 to form a chamber 72. The hydraulic pressure is supplied from the planetary and hydraulic control 50 through a passage 74 formed in the output shaft 30.

The movable sheave 28 is also controlled by a compression spring 76 disposed between the piston 68 and the movable sheave 28 to urge the sheave 28 leftward, as viewed in FIG. 1, to the position shown. This places the transmission 10 in the lowest speed ratio which will provide the highest torque ratio. The spring is designed to ensure a minimum torque capacity, such that a drive relationship between the engine and the planetary transmission and hydraulic control 50 will be established during startup independently of hydraulic fluid being supplied.

The hydraulic control 50 will supply fluid in a well known manner to the compound piston assembly 34 to establish the desired ratio as indicated by the vehicle or engine throttle setting and engine speed. The hydraulic system will also supply a balancing pressure to the chamber 72, such that the proper transmission ratio will be established between the sheaves 16 and 18. The planetary and control mechanism can incorporate a simple forward/reverse planetary arrangement desired or a multi-speed planetary arrangement. Both such planetary systems are well known.

Figure 2:
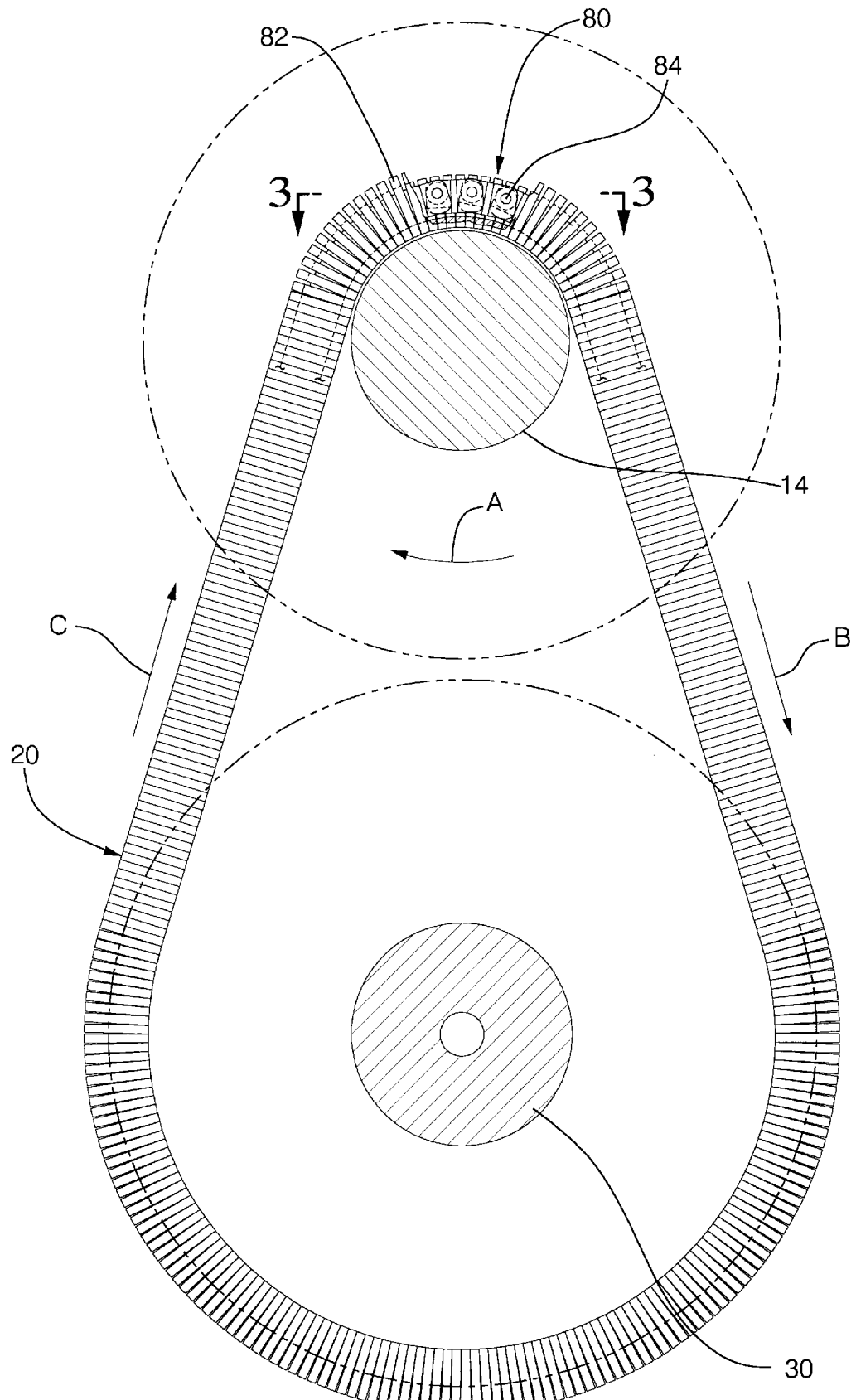
FIG. 2 is a view taken along line 2—2 in FIG. 1.
Figure 3:
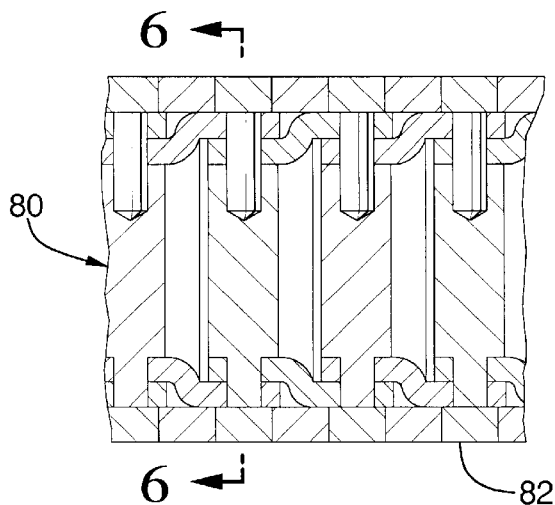
FIG. 3 is a view taken along line 3—3 in FIG. 2.
Figure 4:
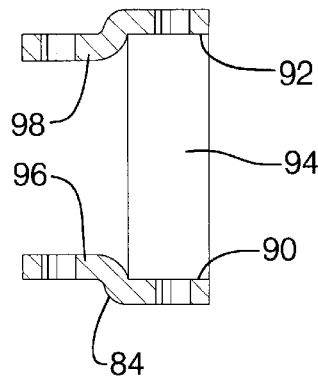
FIG. 4 is a top view of a chain link.
Figure 5:
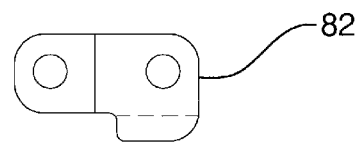
FIG. 5 is a side view of the chain link shown in FIG. 4.

As seen in FIG. 2, the endless belt 20 is trained between the input shaft 16 and output shaft 30 so as to frictionally engage the input pulley 16 and the output pulley 18. The endless belt 20 transmits power between the input pulley 16 and the output pulley 30 in the direction of rotation of arrow A which is the engine output shaft rotation direction. The endless belt 20 is therefore placed in compression in the direction of arrow B between the pulleys and in tension in the direction of arrow C between the pulleys.

The endless belt 20 is comprised of an endless link chain 80 and a plurality of blocks 82. The chain 80 is formed with a plurality of pivotally connected links 84. The blocks 82 frictionally engage the input pulley 16 and the output pulley 18, such that in the direction of arrow B, the blocks are placed in compression between the pulleys. However, in the direction of arrow C, the blocks 82 are not loaded in compression between from the output pulley 18 to the input pulley 16. The present invention transfers torque in the direction of arrow C by incorporating the link chain 80 thus transferring power through tension.

As best seen in FIGS. 3 through 6, the link chain 80 has a plurality of the links 84 interconnected with each other through a post 86 and pin 88. Each link 84 has spaced walls 90 and 92 and a lower or under platform 94 interconnecting the walls 92 and 90. The wall 90 has an inwardly extending wall portion 96 and the wall 92 has an inwardly extending wall portion 98 which reduces the space between the walls.

Figure 6:
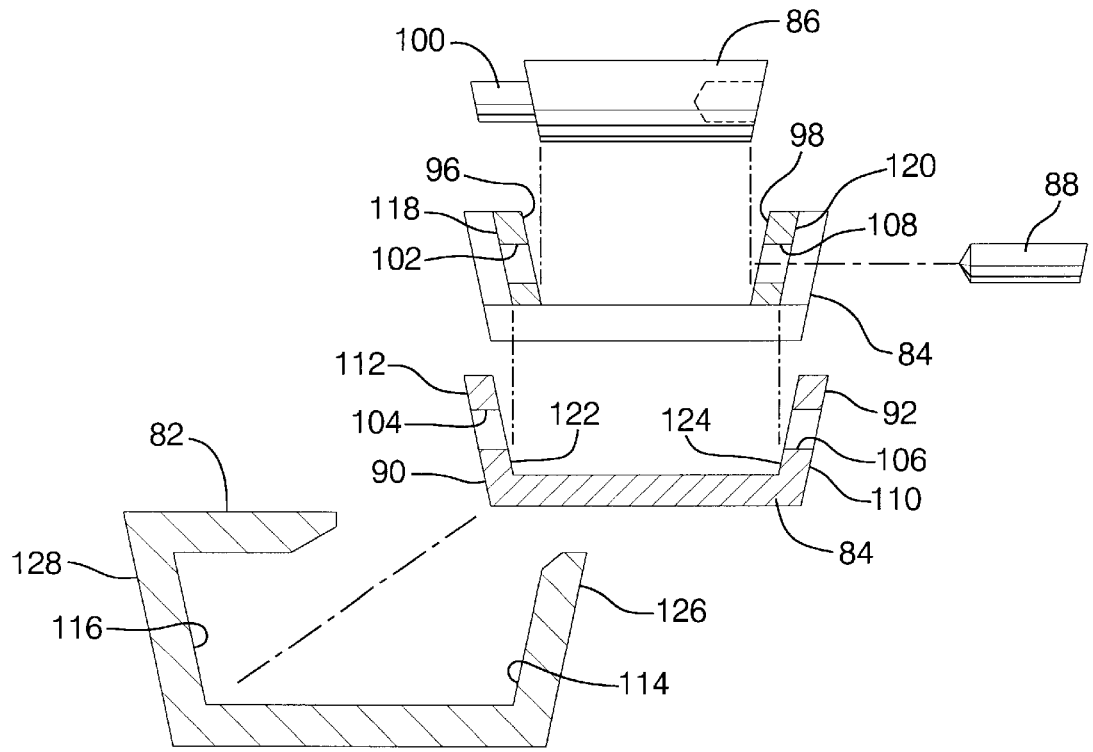
FIG. 6 is an exploded view of a link assembly taken along line 6—6 of FIG. 3.

The post 86, as best seen in FIG. 6, is designed to fill the space between the walls 98 and 96 when the links 84 are interconnected. The inwardly extending wall portions 96 and 98 fit within the walls 90 and 92 of the adjacent link member. The post 86 is then inserted such that a post extension 100 engages an opening 102 in the wall 96 and an opening 104 in the wall 90. The pin 88 is inserted through an opening 106 in the wall 92 and through an opening 108 in the wall 98.

Each wall 90 and 92 has tapered surfaces 110 and 112, respectively, which are complementary to tapered surfaces 114 and 116 formed on the interior of each block 82. The walls 96 and 98 have tapering surfaces 118 and 120, respectively, which complementarily engage inner tapered surfaces 122 and 124 of the walls 90 and 92, respectively.

The complementary engagement of the surfaces 110 and 112 with surfaces 114 and 116 provide frictional drive capacity for the endless belt 20 in the direction of arrow C. When force is transmitted in this direction, the block 82 transmits frictional force from the sheaves 26 and 28 through outer tapered surfaces 126 and 128 to the blocks 82. The blocks 82 transmit the frictional force through the complementary tapered surfaces 116,114 to the link 84.

The frictional interface occurs at both the output pulley 18 and input pulley 16 resulting in the input pulley supplying a force in the direction of arrow C to transmit power from the input shaft 14 to the output shaft 30. Thus, the flexible or endless drive belt 20 will transmit power on both the compression side in the direction of arrow B and on the tension side in the direction of arrow C. This increases the power delivery and the overall torque capacity of the transmission 10.

The supplying of lubrication fluid via the conduit 54 ensures proper cooling and lubricating which will reduce the wear and maintain the heat losses at an operable level, such that the increased power transmission between the pulleys can be accommodated.

I claim:

1. A flexible drive mechanism comprising:

first and second sheave assemblies rotatably mounted on spaced shafts in a housing, each sheave having spaced frictional drive surfaces;

means for supplying lubrication liquid to at least one of said drive surfaces;

a plurality of block members selectively frictionally engaging said frictional drive surfaces;

a chain assembly having pivotally connected rigid links supporting said block members, encircling a portion of said first and second sheave assemblies for transmitting power therebetween, said chain assembly having a tension side and a non-tension side and maintaining said block members in frictional engagement with said friction drive surfaces of said sheave assemblies during power transmission to provide a compression loading of said block members extending along said chain on the non-tension side in a column to transmit power between said sheave assemblies;

said rigid pivotally connected links of said chain assembly frictionally engaging an inner portion of said block members when said block members are engaged with said sheave assemblies and said rigid links being subjected to a tension force on the tension side of said chain assembly between said sheave assemblies to transmit power therebetween; and said block members and said chain cooperating to transmit power between said sheave assemblies simultaneously through said compression loading and said tension force.

2. The flexible chain mechanism defined in claim 1 wherein said pivotally interconnected rigid links of said chain assembly each have converging outer side surfaces engaging complementary converging inner surfaces on adjacent ones of said block members.

3. The flexible chain mechanism defined in claim 1 wherein a first of said spaced shafts is drivingly connected with a power source and another of said spaced shafts is drivingly connected with an output mechanism and wherein power is transmitted from said power source through both said tension and non-tension sides of chain assembly to the output mechanism.

* * * * *